United States Patent
Cao (10) Patent No.: US 10,075,302 B2
(45) Date of Patent: Sep. 11, 2018

(54) POWER OVER ETHERNET METHOD AND DEVICE

(71) Applicant: Huawei Technologies Co., Ltd., Shenzhen (CN)

(72) Inventor: Jincan Cao, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/353,278

(22) Filed: Nov. 16, 2016

(65) Prior Publication Data

US 2017/0155517 A1   Jun. 1, 2017

(30) Foreign Application Priority Data

Nov. 30, 2015  (CN) .......................... 2015 1 0859723

(51) Int. Cl.
*H04L 12/10* (2006.01)
*H04L 12/26* (2006.01)
*H04L 12/24* (2006.01)

(52) U.S. Cl.
CPC .......... *H04L 12/10* (2013.01); *H04L 41/0833* (2013.01); *H04L 43/08* (2013.01); *H04L 43/50* (2013.01)

(58) Field of Classification Search
CPC ..... G06F 1/00; G06F 1/26; G06F 1/30; G06F 1/32; G06F 1/266; G01R 27/00; G01R 27/08; H04L 12/10; H04L 12/26; H04L 43/08; H04L 43/50; H04M 9/00
USPC .................. 324/713; 370/252, 402; 375/257; 379/402, 413; 713/300, 310, 320; 714/22
See application file for complete search history.

(56) References Cited

U.S. PATENT DOCUMENTS

| 6,438,163 B1 * | 8/2002 | Raghavan | ............ H03G 3/3052 324/617 |
| 7,239,665 B2 * | 7/2007 | Mezer | ...................... H04B 3/04 375/257 |
| 7,404,091 B1 | 7/2008 | Gere | |

(Continued)

FOREIGN PATENT DOCUMENTS

JP            S5622923 A         3/1981

OTHER PUBLICATIONS

Foreign Communication From a Counterpart Application, European Application No. 16185692.7, Extended European Search Report dated Mar. 29, 2017, 9 pages.

(Continued)

*Primary Examiner* — Shawkat M Ali
(74) *Attorney, Agent, or Firm* — Conley Rose, P.C.

(57) ABSTRACT

A Power over Ethernet method and device, where the Power over Ethernet method includes: determining, by PSE, a maximum power of a PD according to a classification class of the PD; obtaining, by the PSE, a length of a network cable between the PSE and the PD; determining, by the PSE, a type of the network cable; calculating, by the PSE, a loss power of the network cable according to the length of the network cable and the type of the network cable; and using, by the PSE, a sum of the maximum power of the PD and the loss power of the network cable as a supply power, to supply power to the PD. The Power over Ethernet method and device provided in the present disclosure improves usage efficiency of the PSE supply power.

6 Claims, 8 Drawing Sheets

(56) References Cited

U.S. PATENT DOCUMENTS

| | | | |
|---|---|---|---|
| 2006/0210057 A1* | 9/2006 | Stanford | H04L 12/10 379/413 |
| 2007/0135086 A1* | 6/2007 | Stanford | H04L 12/10 455/402 |
| 2008/0148081 A1 | 6/2008 | Diab et al. | |
| 2008/0252307 A1* | 10/2008 | Schindler | G06F 1/266 324/713 |
| 2009/0210725 A1* | 8/2009 | Kim | H04L 12/10 713/300 |
| 2012/0317426 A1 | 12/2012 | Hunter, Jr. et al. | |
| 2014/0022929 A1 | 1/2014 | Diab et al. | |
| 2014/0250327 A1* | 9/2014 | Flynn | G06F 1/30 714/22 |
| 2015/0333993 A1* | 11/2015 | Welin | H04L 43/0882 370/252 |
| 2016/0127135 A1* | 5/2016 | Balasubramanian | H04L 12/10 713/300 |

OTHER PUBLICATIONS

Machine Translation and Abstract of Japanese Publication No. JP5622923, dated Mar. 4, 1981, 21 pages.

Foreign Communication From a Counterpart Application, Japanese Application No. 2016-195563, Japanese Office Action dated Sep. 26, 2017, 2 pages.

Foreign Communication From a Counterpart Application, Japanese Application No. 2016-195563, English Translation of Japanese Office Action dated Sep. 26, 2017, 3 pages.

* cited by examiner

POWER OVER ETHERNET METHOD AND DEVICE

CROSS-REFERENCE TO RELATED APPLICATION

This application claims priority to Chinese Patent Application No. 201510859723.1, filed on Nov. 30, 2015, which is hereby incorporated by reference in its entirety.

TECHNICAL FIELD

The present disclosure relates to the field of communications technologies, and in particular, to a Power over Ethernet method and device.

BACKGROUND

A Power over Ethernet (POE) technology refers to that power is provided for an access device, such as an Internet Protocol (IP) telephone, a camera, or an access point (AP), using the Ethernet.

Generally, a POE system includes power sourcing equipment (PSE) and a powered device (PD). The PSE supplies power to the PD using the Ethernet, and also is a manager of a Power over Ethernet process in the entire POE system.

When the PSE supplies power to the PD over the Ethernet, a network cable power loss is caused, and the PSE needs to reserve network cable power loss, to meet a power requirement of the PD. Currently, the PSE performs power reservation according to a maximum network cable loss in a worst case (a loss caused when a network cable has maximum direct current impedance and a length of 100 meters) defined in a standard. However, in an actually deployed POE system, a network cable loss is not always a loss in the worst case. Therefore, a power that needs to be reserved for the network cable loss may be very small. If the PSE always performs power reservation according to the maximum network cable loss in the worst case, PSE power is wasted, and usage of the PSE power is reduced.

SUMMARY

This application provides a Power over Ethernet method and device, which improve usage efficiency of PSE supply power.

According to a first aspect, this application provides a Power over Ethernet method, including determining, by PSE, a maximum power of a PD according to a classification class of the PD, obtaining, by the PSE, a length of a network cable between the PSE and the PD, determining, by the PSE, a type of the network cable, calculating, by the PSE, a loss power of the network cable according to the length of the network cable and the type of the network cable, and using, by the PSE, a sum of the maximum power of the PD and the loss power of the network cable as a supply power, to supply power to the PD. An actually used PD power, network cable length, and network cable type are identified, the loss power of the network cable is calculated according to the actually used PD power, network cable length, and network cable type, and the supply power of the PSE is determined, which can improve usage efficiency of the PSE supply power.

With reference to the first aspect, in a first possible implementation manner of the first aspect, the PSE reads n measured lengths of the network cable using a physical layer (PHY) chip, and the PSE calculates the length of the network cable from the n measured lengths of the network cable using a convergence algorithm. Because the length of the network cable is measured for a plurality of times and an actual length of the network cable is obtained from multiple measured lengths of the network cable using the convergence algorithm, precision of the measured lengths and an actual length of the network cable is improved.

With reference to the first possible implementation manner of the first aspect, in a second possible implementation manner of the first aspect, the PSE calculates an optimal value of each measured length of the network cable using a Kalman filtering algorithm, the PSE obtains a convergence length of the network cable from the optimal values of the n measured lengths of the network cable using the convergence algorithm, and the PSE uses the convergence length of the network cable as the length of the network cable. A plurality of measurements is consolidated using an appropriate filtering algorithm, which increases test accuracy of the actual length of the network cable, and further improves usage efficiency of the PSE supply power.

With reference to the second possible implementation manner of the first aspect, in a third possible implementation manner of the first aspect, the PSE uses an optimal value of a $(k-1)^{th}$ measured length of the network cable as a predictor of a $k^{th}$ length of the network cable, and the PSE calculates an optimal value of the $k^{th}$ length of the network cable according to the predictor of the $k^{th}$ length of the network cable and the $k^{th}$ measured length of the network cable. The optimal value of each measured length of the network cable is calculated using the Kalman filtering algorithm, which improves precision of the actual length of the network cable.

With reference to the third possible implementation manner of the first aspect, in a fourth possible implementation manner of the first aspect, the PSE calculates the optimal value $L(k|k)$ of the $k^{th}$ length of the network cable using a formula $L(k|k)=L(k|k-1)+Kg(k)(Z(k)-HL(k|k-1))$, where $L(k|k-1)$ is the predictor of the $k^{th}$ length of the network cable, $Kg(k)$ is a $k^{th}$ Kalman gain of the network cable, $Z(k)$ is a read $k^{th}$ measured length of the network cable, H is a length fluctuation, and a value of H is set to 1. An optimal value of a length of the network cable in a current state is calculated according to a predictor of a length of the network cable in a previous state and a measured length of the network cable in the current state, which improves the precision of the actual length of the network cable.

With reference to the first aspect to the fourth possible implementation manner of the first aspect, in a fifth possible implementation manner of the first aspect, before determining the type of the network cable, the PSE determines whether the PHY chip reads a link signal-to-noise ratio of the network cable, and if the PHY chip reads the link signal-to-noise ratio of the network cable, the PSE determines the type of the network cable according to a mapping relationship table between the length of the network cable and the type of the network cable and between the link signal-to-noise ratio and the type of the network cable, or if the PHY chip does not read the link signal-to-noise ratio of the network cable, the PSE sets the type of the network cable to a preset network cable type. Therefore, before the type of the network cable is determined, the type of the network cable can be accurately determined according to the link signal-to-noise ratio of the network cable, which enhances accuracy of the type of the network cable, improves precision of the loss power of the network cable, and further improves the usage efficiency of the PSE supply power.

With reference to the first aspect to the fifth possible implementation manner of the first aspect, in a sixth possible implementation manner of the first aspect, the PSE identifies the classification class of the PD using a PSE chip. Because the PSE identifies the classification class of the PD, and determines the maximum power of the PD according to the classification class of the PD, precision of a maximum power value of the PD is improved.

With reference to the first aspect to the sixth possible implementation manner of the first aspect, in a seventh possible implementation manner of the first aspect, the PSE determines direct current impedance per 100 meters of the network cable according to the type of the network cable, and the PSE calculates the loss power Pch of the network cable using a formula Pch=Ipd^2*L0*Rs/100, where Ipd is a maximum current of the PD, Rs is the direct current impedance per 100 meters of the network cable, and L0 is the length of the network cable. Therefore, the loss power Pch of the network cable can be precisely calculated using a formula, which further improves the usage efficiency of the PSE supply power.

With reference to the fourth possible implementation manner of the first aspect, in one possible implementation manner, the PSE calculates the $k^{th}$ Kalman gain Kg(k) of the network cable using a formula Kg(k)=P(k|k−1)$H^T$/(HP(k|k−1)$H^T$+R), and the PSE calculates, using a formula P(k|k−1)=AP(k−1|k−1)$A^T$+Q), covariance corresponding to the predictor L(k|k−1) of the $k^{th}$ length of the network cable, where R indicates noise covariance in a measurement equation, $A^T$ is a transpose of a matrix A, where A=$A^T$=1, and $H^T$ is a transpose of a matrix H, where H=$H^T$=1. A Kalman gain Kg(k) can be precisely calculated using a formula such that an optimal value of the actual length of the network cable can be precisely calculated, which further improves the precision of the actual length of the network cable.

According to a second aspect, this application provides a Power over Ethernet device that has functions of implementing behaviors of PSE in the foregoing method. The functions may be implemented using hardware, or may be implemented by executing corresponding software by the hardware. The hardware or software includes one or more modules that correspond to the foregoing functions. The modules may be software and/or hardware.

In one possible implementation manner, the Power over Ethernet device includes a PSE chip, a PHY chip, and a processor, where the PSE chip is configured to determine a maximum power of a PD according to a classification class of the PD, the PHY chip is configured to read a measured length of a network cable, and the processor is configured to obtain a length of the network cable between the Power over Ethernet device and the PD according to the measured length of the network cable read by the PHY chip, determine a type of the network cable, calculate a loss power of the network cable according to the length of the network cable and the type of the network cable, and use a sum of the maximum power of the PD and the loss power of the network cable as a supply power, to supply power to the PD. An actually used PD power, network cable type, and network cable length are identified, and with reference to a problem of an inaccurately detected network cable length encountered in an actual scenario, an optimal PSE supply power is calculated using a filtering algorithm, which further improves usage efficiency of the PSE supply power.

In another possible implementation manner, the Power over Ethernet device includes a PSE chip, a PHY chip, and a processor, where the PSE chip is configured to determine a maximum power of a PD according to a classification class of the PD, the PHY chip is configured to read a measured length of a network cable, and the processor includes a determining module and a calculation module, where the determining module is configured to determine a type of the network cable, and the calculation module is configured to obtain a length of the network cable between the Power over Ethernet device and the PD according to the measured length of the network cable read by the PHY chip, calculate a loss power of the network cable according to the length of the network cable and the type of the network cable, and use a sum of the maximum power of the PD and the loss power of the network cable as a supply power of the PSE.

According to a third aspect, this application provides a Power over Ethernet system, including the PSE and the PD according to the foregoing aspects, where the PSE is connected to the PD using an Ethernet cable and supplies power to the PD using the Ethernet cable.

According to the Power over Ethernet method and device provided in the present disclosure, PSE determines a maximum power of a PD according to a classification class of the PD, the PSE obtains a length of a network cable between the PSE and the PD, the PSE determines a type of the network cable, the PSE calculates a loss power of the network cable according to the length of the network cable and the type of the network cable, and the PSE uses a sum of the maximum power of the PD and the loss power of the network cable as a supply power, to supply power to the PD. An actually used PD power, network cable length, and network cable type are identified, the loss power of the network cable is calculated according to the actually used PD power, network cable length, and network cable type, and the supply power of the PSE is determined, which can improve usage efficiency of the PSE supply power.

DESCRIPTION OF EMBODIMENTS

The following describes technical solutions in embodiments of the present disclosure with reference to the accompanying drawings in the embodiments of the present disclosure.

POE refers to a technology of providing, using an Ethernet cable, direct current power supply for some terminals, such as a network telephone and a network camera. A POE system includes PSE and a PD, where the PSE is connected to the PD using an Ethernet cable and supplies power to the PD using the Ethernet cable. Further, a working process of Power over Ethernet includes 1. Detection At the start, the PSE outputs a detection voltage at a port to detect whether a PD is connected at an opposite end of an Ethernet cable. 2. PD classification After a PD is detected, the PSE performs classification for the PD and detects a maximum power required by the PD. 3. Start of power supplying Within a start-up period of a configurable time (generally less than 15 ms), the PSE starts to supply power to the PD at a relatively low voltage until the PSE provides direct current power at an input voltage within a range specified by a standard. 4. Power supplying The PSE provides stable and reliable direct current power for the PD to meet a power consumption requirement of the PD device. During a power supplying process of the POE system, the PSE needs to output a supply power to meet power requirements of the PD and a loss power of the network cable. Currently, the PSE uses a maximum network cable loss in a worst case defined in a standard as a loss power of a network. However, in the technical solutions provided in this application, an actual loss power of a network cable (generally less than the maximum network cable loss in the worst case) is calculated according to a length of the network cable and a type of the network cable, and further a supply power of the PSE is determined, thereby effectively improving usage efficiency of the supply power.

Figure 1:
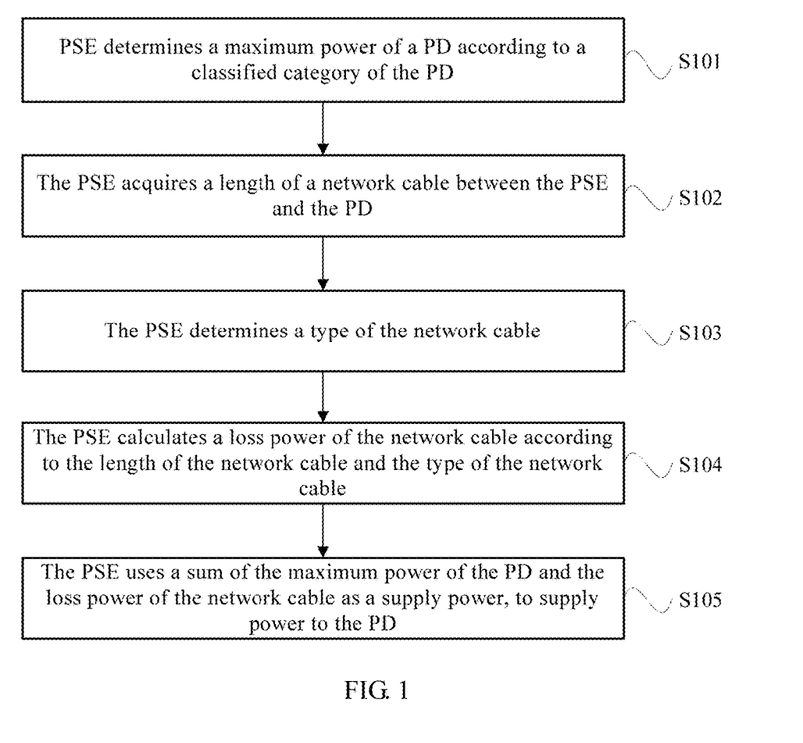
FIG. 1 is a flowchart of a Power over Ethernet method according to this application.

FIG. 1 is a flowchart of a Power over Ethernet method according to this application. As shown in FIG. 1, the method includes S101. PSE determines a maximum power of a PD according to a classification class of the PD.

Further, when the PSE detects that a PD is connected at one end of a cable, a classifying chip in the PSE performs classification for the PD. Because different classified categories of the PD correspond to different required maximum powers, and each classification class of the PD corresponds to a maximum power required by the PD, a one-to-one mapping table is formed between the classified categories of the PD and the maximum powers required by the PD. Therefore, the maximum power of the PD can be determined according to the mapping table between classified categories of the PD and maximum powers required by the PD.

S102. The PSE obtains a length of a network cable between the PSE and the PD.

Further, an actually used length of the network cable between the PSE and the PD may be identified using a corresponding chip, for example, a PHY chip. A PHY chip is described in detail in the following embodiment, and details are not repeated in this embodiment of the present disclosure.

S103. The PSE determines a type of the network cable.

Further, there may be multiple types of the network cable between the PSE and the PD. Currently, network cables are generally classified into types such as category 3, category 4, category 5 (CAT5), category 5 enhanced, category 6 (CAT6), and category 7 twisted pairs. The type of the network cable may be determined according to a link signal-to-noise ratio of the network cable and the length of the network cable, or the type of the network cable may be determined with reference to an actual scenario.

S104. The PSE calculates a loss power of the network cable according to the length of the network cable and the type of the network cable.

In this embodiment of the present disclosure, the loss power of the network cable may be calculated according to the length of the network cable and the type of the network cable using a formula specified in a standard. Further, the loss power Pch of the network cable may be calculated using a formula $Pch=Ipd^2*L0*Rs/100$, where Ipd is a maximum current of the PD, Rs is direct current impedance per 100 meters of the network cable, and L0 is the length of the network cable.

It should be noted that the direct current impedance per 100 meters of the network cable is related to the type of the network cable, and different network cable types correspond to different direct current impedance per 100 meters of a network cable.

S105. The PSE uses a sum of the maximum power of the PD and the loss power of the network cable as a supply power, to supply power to the PD.

Further, the supply power Ppse of the PSE is calculated using a formula $Ppse=Ppd+Pch$, where Ppd is the maximum power of the PD and Pch is the loss power of the network cable. A power configuration value Ppse is applied for to a POE system according to the supply power of the PSE.

It should be noted that the supply power of the PSE refers to a power that the PSE needs to output, and that the supply power of the PSE not only includes the maximum power required by the PD but also includes the loss power of the network cable between the PSE and the PD.

It should be noted that, a supply power reservation method provided in this embodiment of the present disclosure may be applied to any power supply link loss calculation scheme, for example, power distribution in an equipment room or power distribution in a power grid, and can effectively improve usage efficiency of the supply power.

According to the Power over Ethernet method provided in this embodiment of the present disclosure, PSE determines a maximum power of a PD according to a classification class of the PD, the PSE obtains a length of a network cable between the PSE and the PD, the PSE determines a type of the network cable, the PSE calculates a loss power of the network cable according to the length of the network cable and the type of the network cable, and the PSE uses a sum of the maximum power of the PD and the loss power of the network cable as a supply power, to supply power to the PD. An actually used PD power, network cable length, and network cable type are identified, the loss power of the network cable is calculated according to the actually used PD power, network cable length, and network cable type, and the supply power of the PSE is determined, which can improve usage efficiency of the PSE supply power.

Figure 2:
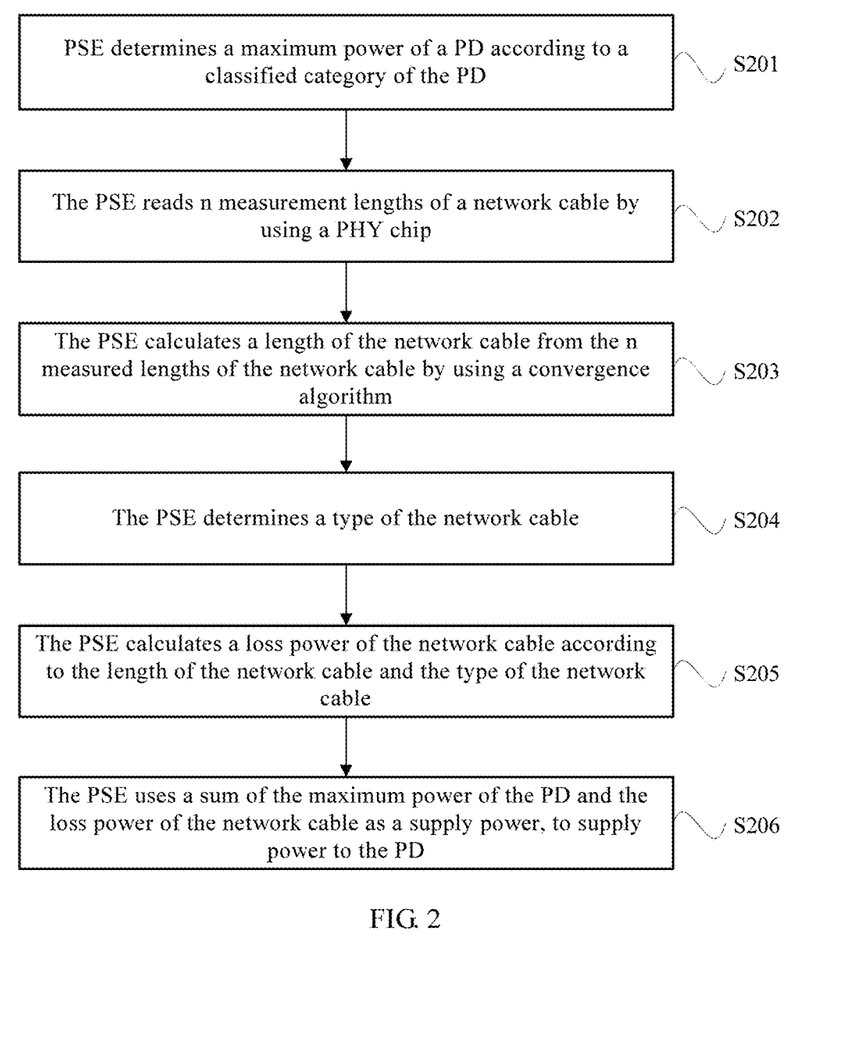
FIG. 2 is a flowchart of another Power over Ethernet method according to this application.

On the basis of the Power over Ethernet method shown in FIG. 1, the following describes a specific implementation manner of the method in detail, as shown in FIG. 2. FIG. 2 is a flowchart of another Power over Ethernet method according to this application. The method includes S201 PSE determines a maximum power of a PD according to a classification class of the PD.

It should be noted that, an implementation manner of S201 is the same as that of S101. For details, refer to descriptions in S101, and details are not described herein.

S202. The PSE reads n measured lengths of a network cable using a PHY chip. n indicates a quantity of times that the PHY chip reads a measured length of the network cable, and n is a positive integer greater than or equal to 1.

Further, the measured length of the network cable is read using a virtual cable test (VCT) function of the PHY chip. The VCT may detect a cable connected to an Ethernet port once and display a detection result. When a cable state is normal, a length in displayed information refers to a total length of the network cable, when the cable state is abnormal, a length in displayed information refers to a length between a local interface and an abnormal location. A plurality of measured lengths of the network cable may be read using the VCT to read the network cable for a plurality of times. It should be noted that the VCT utilizes time domain reflectometry (TDR) to detect a physical state of the network cable. A detection principle of the TDR is similar to that of a radar. A working manner of the TDR is detecting a cable fault by proactively transmitting a pulse signal to a conducting wire and detecting a reflection result of the transmitted pulse signal. When the transmitted pulse signal passes through an end of a cable or a faulty point of a cable, a part or all pulse energies are reflected back to reach an original send source. In a VCT technology, a time at which the signal reaches the faulty point or is returned is obtained by measuring transmission of the pulse signal in the conducting wire, and then the corresponding time is converted into a distance value according to a formula. A specific detection principle of the TDR is the same as a detection principle of the TDR in the prior art, and details are not described in this embodiment of the present disclosure.

S203. The PSE calculates a length of the network cable from n measured lengths of the network cable using a convergence algorithm.

Optionally, that the PSE calculates a length of the network cable from n measured lengths of the network cable using a convergence algorithm includes calculating, by the PSE, an optimal value of each measured length of the network cable using a Kalman filtering algorithm, obtaining, by the PSE, a convergence length of the network cable from the optimal values of the n measured lengths of the network cable using the convergence algorithm, and using, by the PSE, the convergence length of the network cable as the length of the network cable.

It should be noted that, due to restrictions in PHY technological levels of different manufacturers and noise in an actual measurement process, a difference between a measurement value obtained from a single test and an actual value is excessively large, therefore, data obtained from a plurality of measurements is consolidated using an appropriate filtering algorithm, to increase test accuracy of a real length of the network cable and further improve usage efficiency of the PSE supply power. In this embodiment of the present disclosure, on the basis that the PHY chip reads the n measured lengths of the network cable, the optimal value of each measured length is calculated from the n measured lengths of the network cable using the Kalman filtering algorithm, and the convergence length of the network cable is obtained from the optimal values of the n measured lengths of the network cable using the convergence algorithm.

For example, if the n measured lengths of the network cable read by the PHY chip are l1, l2 ..., ln, respectively, the optimal values of the length of the network cable obtained after Kalman filtering is performed on the n measured lengths are d1, d2 ..., dn, respectively, and a convergence value obtained from the optimal values of the length of the network cable using the convergence algorithm is l0, the convergence length l0 of the network cable is used as the actual length of the network cable.

Optionally, the calculating, by the PSE, an optimal value of each measured length of the network cable using a Kalman filtering algorithm includes using, by the PSE, an optimal value of a $(k-1)^{th}$ measured length of the network cable as a predictor of a $k^{th}$ length of the network cable, where k indicates a specific time of times that the PHY chip reads a measured length of the network cable, and k=1, 2, ..., n, and calculating, by the PSE, an optimal value of the $k^{th}$ length of the network cable according to the predictor of the $k^{th}$ length of the network cable and the $k^{th}$ measured length of the network cable.

Optionally, the calculating, by the PSE, an optimal value of the $k^{th}$ length of the network cable according to the predictor of the $k^{th}$ length of the network cable and the $k^{th}$ measured length of the network cable includes calculating, by the PSE, the optimal value L(k|k) of the $k^{th}$ length of the network cable using a formula L(k|k)=L(k|k−1)+Kg(k)(Z(k)−HL(k|k−1)), where L(k|k−1) is the predictor of the $k^{th}$ length of the network cable, Kg(k) is a $k^{th}$ Kalman gain of the network cable, Z(k) is a read $k^{th}$ measured length of the network cable, H is a length fluctuation, and a value of H is set to 1.

Further, key equations of a Kalman filter are as follows status equation: $L(k|k)=AL(k-1|k-1)+BU(k)+W(k)$, and measurement equation: $Z(k)=H*L(k)+V(k)$, where L(k−1|k−1) is an optimal value of the $(k-1)^{th}$ measured length of the network cable, A and B are confidence relationships between a current prediction parameter and a disturbance parameter and between an optimal value in a previous state and a disturbance parameter, respectively, U(k) is a control value of a current state, where this value may be 0 if there is no control value, W(k) and V(k) are separately noise in measurement processes, and H is a fluctuation of a measured length of the network cable on the basis of the length of the network cable.

In this embodiment of the present disclosure, A=B=1, U(k)=0, H=1, and a value range of process noise W(k) is (0, Q), where Q is covariance of the process noise W(k), and indicates length covariance of the actual length of the network cable that changes with parametric values such as a temperature and a humidity in a plurality of measurement processes. Therefore, the key equations of the Kalman filter may be equivalent to status equation: $L(k)=L(k-1)+Q$, and measurement equation: $L=L0+sqrt(\sigma)*rand(-1,1)$, where the state equation indicates that the predictor of the $k^{th}$ length of the network cable is the optimal value of the $(k-1)^{th}$ measured length of the network cable, L indicates a specific length of the network cable, L0 indicates the length of the network cable, and σ indicates a maximum deviation between a measurement value and an actual value of the network cable.

Optionally, the $k^{th}$ Kalman gain Kg(k) of the network cable is calculated using a formula Kg(k)=P(k|k−1)$H^T$/(HP(k|k−1)$H^T$+R).

Optionally, covariance that corresponds to the predictor L(k|k−1 of the $k^{th}$ length of the network cable is calculated using a formula P(k|k−1)=AP(k−1|k−1)$A^T$+Q).

Optionally, covariance P(k|k) that corresponds to the optimal value L(k|k) of the $k^{th}$ length of the network cable is calculated using a formula P(k|k)=(I−Kg(k)H)P(k−1|k−1), where R indicates noise covariance in the measurement equation, $A^T$ is a transpose of a matrix A, where A=$A^T$=1, and $H^T$ is a transpose of a matrix H, where H=$H^T$=1.

It should be noted that, the covariance P(k|k) that corresponds to the optimal value L(k|k) of the $k^{th}$ length of the network cable, that is, covariance that corresponds to a predictor of a next $((k+1)^{th})$ length of the network cable, is continuously iterated and updated using the foregoing formula.

It should be noted that, the Kalman filtering algorithm is an algorithm that performs an optimal evaluation on a system state using a linear system state equation and by inputting or outputting observation data through a system.

Figure 3:
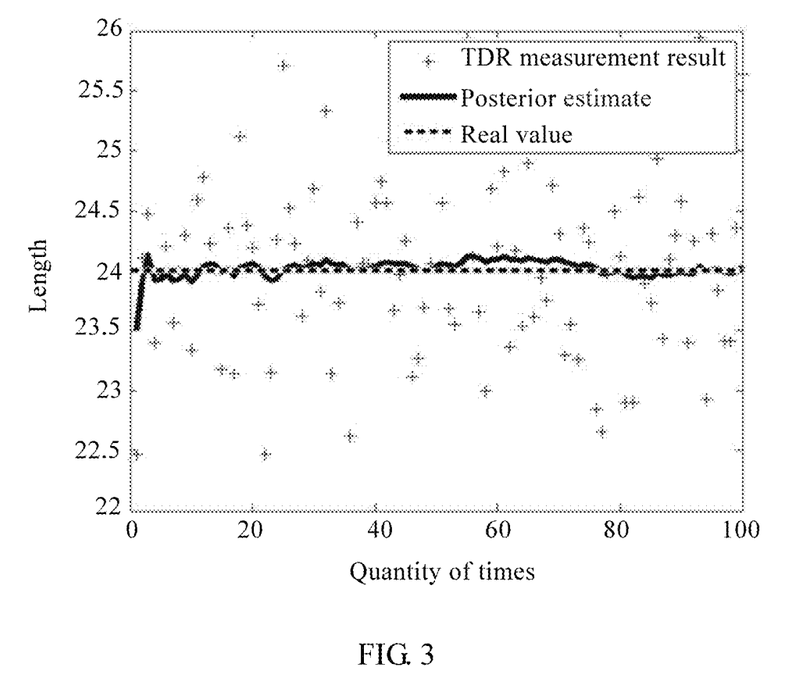
FIG. 3 is a simulation result diagram of predicting a length of a network cable using a Kalman filtering algorithm according to this application.

FIG. 3 is a simulation result diagram of predicting a length of a network cable using a Kalman filtering algorithm according to this application. As shown in FIG. 3, results of actual measurements of a TDR technology used by a VCT function are seriously discrete and are difficult to be precisely predicted. With reference to usage of Kalman (posterior estimate), preset conditions of simulation in FIG. 3 are the real length of the network cable is 24 m, covariance Q of process noise is $1e^{-4}$, and noise covariance R in the measurement equation is equal to 3. The actual length of the network cable can be precisely predicted, and usage efficiency of the supply power is further improved.

S204. The PSE determines a type of the network cable.

S205. The PSE calculates a loss power of the network cable according to the length of the network cable and the type of the network cable.

S206. The PSE uses a sum of the maximum power of the PD and the loss power of the network cable as a supply power, to supply power to the PD.

It should be noted that, implementation manners of S204, S205, and S206 are the same as those of S103, S104, and S105, respectively. For details, refer to descriptions in S103, S104, and S105, and details are not described herein.

According to the Power over Ethernet method provided in this embodiment of the present disclosure, on the basis of the foregoing embodiment and on the basis that PSE reads n measured lengths of a network cable using a PHY chip, the PSE calculates an optimal value of each measured length from the n measured lengths of the network cable using a Kalman filtering algorithm, the PSE obtains a convergence length of the network cable from the optimal values of the n measured lengths of the network cable using a convergence algorithm, and the PSE uses an appropriate filtering algorithm to consolidate data obtained from a plurality of measurements, to increase test accuracy of a real length of the network cable and further improve usage efficiency of a PSE supply power.

Figure 4:
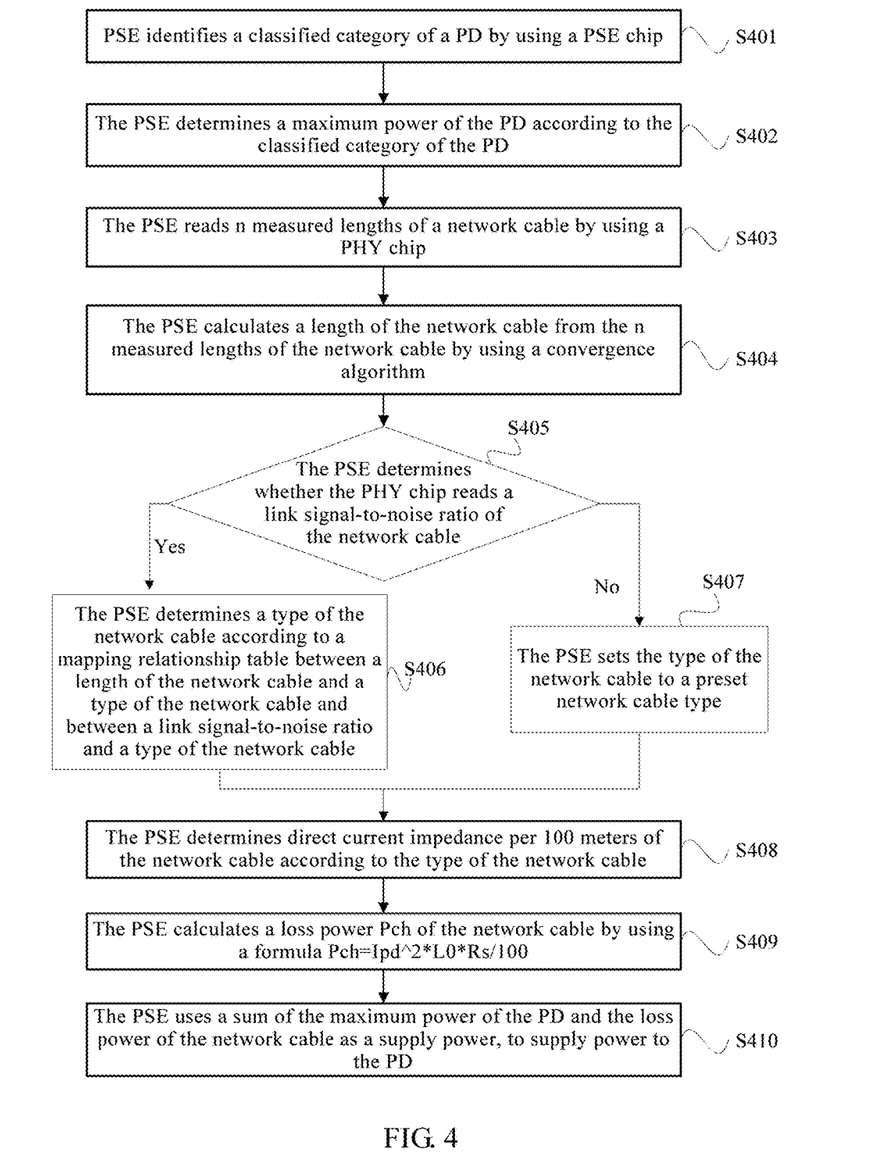
FIG. 4 is a flowchart of still another Power over Ethernet method according to this application.

On the basis of the Power over Ethernet method shown in FIG. 1, the following describes another specific implementation manner of the method in detail, as shown in FIG. 4. FIG. 4 is a flowchart of still another Power over Ethernet method according to this application. The method includes S401. PSE identifies a classification class of a PD using a PSE chip.

S402. The PSE determines a maximum power of the PD according to the classification class of the PD.

Figure 5:
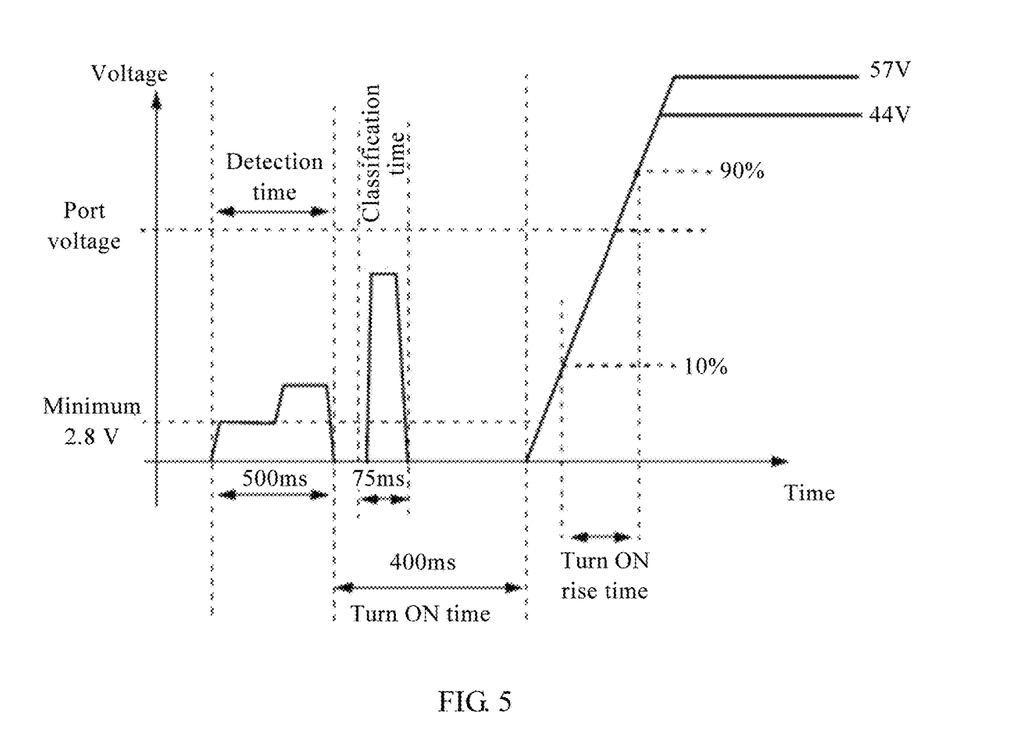
FIG. 5 is a schematic diagram of a power-on, detection, and classification process of a PD according to this application.

Further, in S401 and S402, after detecting the PD, the PSE may perform classification for the PD using the PSE chip. A one-to-one mapping table is formed between classified categories of the PD and maximum powers required by the PD. The maximum power of the PD may be determined according to the classification class of the PD. FIG. 5 is a schematic diagram of a power-on, detection, and classification process of the PD according to this application. As shown in FIG. 5, the power-on, detection, and classification process of the PD is a characteristic that a PD voltage changes from 0 volts (V) to 48 V. A specific power-on, detection, and classification process is as follows Detection phase A purpose of detection is to determine whether a PD that complies with the 802.3 standard is connected to a network cable. When impedance of a kilohm (k ohm) level is connected between a wire pair ½ and a wire pair ⅜(or between a wire pair ⅘ and a wire pair ⅞) of an RJ45 electrical interface, a drain pin on the PSE chip switches to a constant current source mode. When the drain pin outputs 270 microamp (μA) and 110 μA currents, the PSE chip detects a voltage on the drain pin. The PSE chip calculates impedance on a line by dividing a voltage by a current. If a detected impedance value complies with a characteristic of the PD, for example, resistance R on the PD meets 19.5 k ohm≤R≤26 k ohm and capacitance meets C<150 nanofarads (nF), the process enters a classification phase.

Classification phase A purpose of classification is to determine a power level of a currently connected PD and inform the PD of a type (for example, 802.3af or 802.3at) of a connected PSE end.

Power-on phase After the classification succeeds, a gate pin on the PSE chip controls a field effect transistor to conduct, a port of the PSE chip outputs a −48 V voltage, and power-on succeeds. In a stable power supplying phase after the power-on succeeds, a current detection pin continuously monitors an output current. When the output current exceeds a highest threshold (802.3af generally 375 mA, 802.3at generally 600 mA) or is less than a hold current (10 mA), the gate pin on the PSE chip controls the field effect transistor to disconnect and stop power supplying.

S403. The PSE reads n measured lengths of the network cable using a PHY chip.

S404. The PSE calculates a length of the network cable from the n measured lengths of the network cable using a convergence algorithm.

It should be noted that, implementation manners of S403 and S404 are the same as those of S202 and S203, respectively. For details, refer to descriptions in S202 and S203, and details are not described herein.

S405. The PSE determines whether the PHY chip reads a link signal-to-noise ratio of the network cable. If the PHY chip reads the link signal-to-noise ratio of the network cable, S406 is performed, otherwise, S407 is performed.

Further, a loss power of the network cable is related to a type of the network cable, and loss powers of different network cable types are different. However, generally, the type of the network cable is determined according to the link signal-to-noise ratio of the network cable. In this embodiment of the present disclosure, the link signal-to-noise ratio of the network cable is read using the PHY chip, and further the type of the network cable is determined according to the read link signal-to-noise ratio of the network cable. However, in actual use, not all PHY chips support direct reading of a signal-to-noise ratio. For example, currently, both 2.5 gigabit (G) and 10G PHY chips support direct reading of signal-to-noise ratio data, but some fast Ethernet (FE) PHY chips and some gigabit Ethernet (GE) PHY chips do not support direct reading of a signal-to-noise ratio. Therefore, whether the PHY chip reads the link signal-to-noise ratio of the network cable, that is, whether the PHY chip supports direct reading of the signal-to-noise ratio, needs to be determined.

S406. The PSE determines a type of the network cable according to a mapping relationship table between the length of the network cable and the type of the network cable and between the link signal-to-noise ratio and the type of the network cable, and performs S408.

Figure 6:
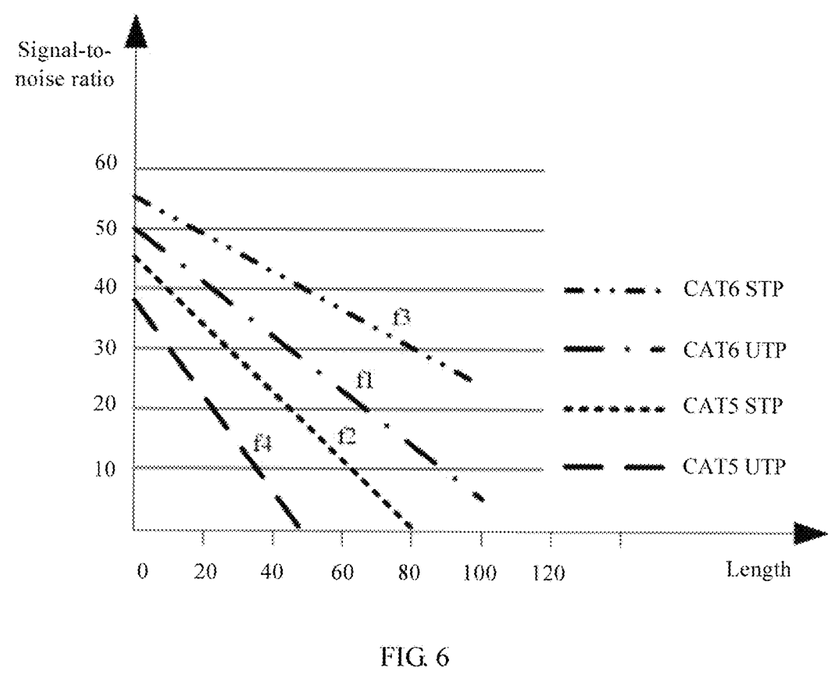
FIG. 6 is a schematic diagram of determining a type of a network cable according to a link signal-to-noise ratio and a length of the network cable according to this application.

In this embodiment of the present disclosure, when the PHY chip reads the link signal-to-noise ratio of the network cable, that is, when the PHY chip supports direct reading of the signal-to-noise ratio, the type of the network cable may be determined according to the link signal-to-noise ratio of the network cable read by the PHY chip. Further, if the link signal-to-noise ratio is used as a vertical coordinate and the length of the network cable is used as a horizontal coordinate, points formed by the link signal-to-noise ratio and the length of the network cable may correspond to a straight line, and the type of the network cable may be determined according to a slope of the straight line. Therefore, there is a one-to-one correspondence relationship among the length of the network cable, a link signal-to-noise ratio, and a type of the network cable, and the type of the network cable may be determined according to the length of the network cable and the link signal-to-noise ratio. The mapping relationship table is used to indicate a correspondence relationship among the length of the network cable, the link signal-to-noise ratio of the network cable, and the type of the network cable. It should be noted that, the PSE may pre-store the mapping relationship table between the length of the network cable and the type of the network cable and between the link signal-to-noise ratio and the type of the network cable. When the PHY chip reads the link signal-to-noise ratio of the network cable, the PSE may determine the type of the network cable by querying the mapping relationship table between the length of the network cable and the type of the network cable and between the link signal-to-noise ratio and the type of the network cable according to the read link signal-to-noise ratio of the network cable and the length of the network cable obtained through calculation in the foregoing step. FIG. 6 is a schematic diagram of determining a type of a network cable according to a link signal-to-noise ratio and a length of the network cable according to this application. As shown in FIG. 6, a length of the network cable is used as a coordinate of an X-axis, a signal-to-noise ratio of the network cable is used as a coordinate of a Y-axis, an interval determined by the X and Y axes may include multiple straight lines, and a slope of each straight line corresponds to a network cable type. For example, in FIG. 6, a straight line f1 corresponds to a CAT6 unshielded twisted pair (UTP), a straight line f2 corresponds to a CAT5 shielded twisted pair (STP), a straight line f3 corresponds to a CAT6 shielded twisted pair, and a straight line f4 corresponds to a CAT5 unshielded twisted pair. For example, if the signal-to-noise ratio (SNR) of the network cable read by the PHY chip is 18 decibels (dB) and the length of the network cable calculated in S404 is 40 meters (m), a point (40,18) formed by the signal-to-noise ratio and the length of the network cable falls on the straight line f2, and then, the type of the network cable can be determined as a CAT5 shielded twisted pair.

S407. The PSE sets the type of the network cable to a preset network cable type, and performs S408.

Further, when the PHY chip does not read the link signal-to-noise ratio of the network cable, that is, when the PHY chip does not support direct reading of the signal-to-noise ratio, the type of the network cable may be set to a preset network cable type with reference to an actual scenario. The preset network cable type may be set according to an actual application scenario. For example, if the actual application scenario is an FE and/or GE scenario, the type of the network cable is set to CAT5.

S408. The PSE determines direct current impedance per 100 meters of the network cable according to the type of the network cable.

S409. The PSE calculates a loss power Pch of the network cable using a formula $Pch=Ipd^2*L0*Rs/100$. Ipd is a maximum current of the PD, Rs is the direct current impedance per 100 meters of the network cable, and L0 is the length of the network cable.

Further, in S408 and S409, the direct current impedance per 100 meters of the network cable is related to the type of the network cable. Different network cable types correspond to different direct current impedance per 100 meters of a network cable. Table 1 lists direct current impedance corresponding to different network cable types. As shown in Table 1, the direct current impedance per 100 meters of the network cable may be determined according to the type of the network cable. For example, if the type of the network cable is determined as CAT5 in the foregoing step, it may be obtained according to Table 1 that direct current impedance Rs corresponding to CAT5 is 12.5 ohm/100 m (ohm/100 m).

TABLE 1

| No. | Network cable type | Direct current impedance (ohm/100 m) |
|---|---|---|
| 1 | CAT5 | 12.5 ohm |
| 2 | CAT6 | 6.7 ohm |

S410. The PSE uses a sum of the maximum power of the PD and the loss power of the network cable as a supply power, to supply power to the PD.

It should be noted that, an implementation manner of S410 is the same as that of S105. For details, refer to descriptions in S105, and details are not described herein.

According to the Power over Ethernet method provided in this embodiment of the present disclosure, an actually used PD power, network cable type, and network cable length are identified, and with reference to a problem of an inaccurately detected network cable length encountered in an actual scenario, an optimal PSE supply power is calculated using a filtering algorithm, which further improves usage efficiency of a PSE supply power.

Figure 7:
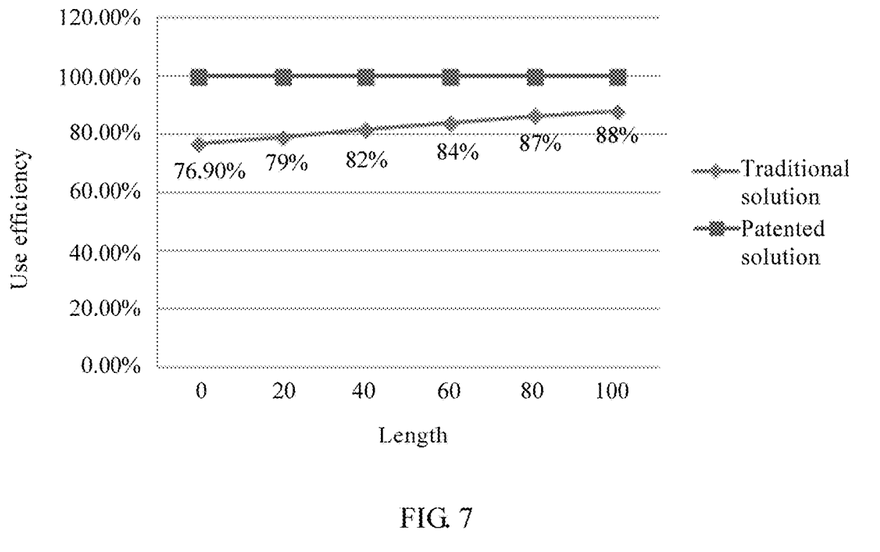
FIG. 7 is a schematic comparison diagram of usage efficiency of a PSE supply power in an FE scenario according to this application.
Figure 8:
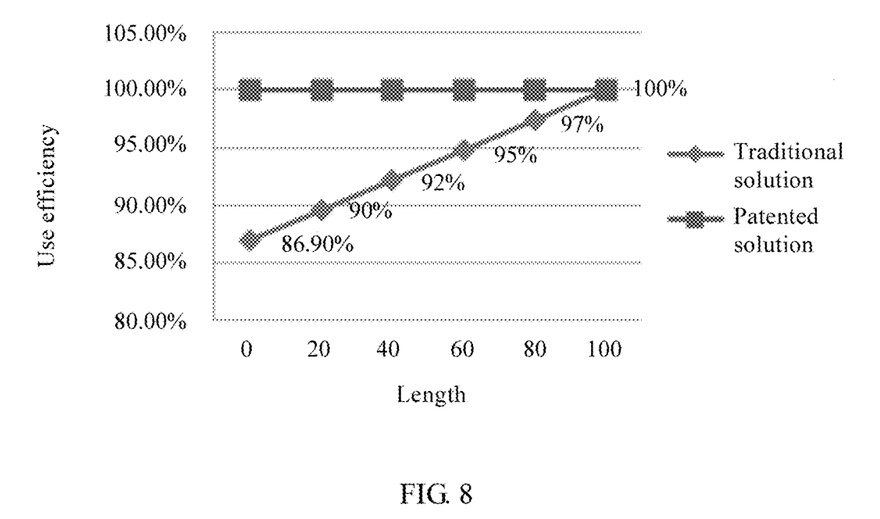
FIG. 8 is a schematic comparison diagram of usage efficiency of a PSE supply power in a GE scenario according to this application.

In this embodiment of the present disclosure, FIG. 7 is a schematic comparison diagram of usage efficiency of a PSE supply power in an FE scenario according to this application. As shown in FIG. 7, in the FE scenario, when a PD power is 60 watts (W) and a CAT6A network cable is used, compared with a traditional Power over Ethernet method, the Power over Ethernet method provided in the embodiments of the present disclosure can improve usage efficiency of a PSE supply power by 20%. FIG. 8 is a schematic comparison diagram of usage efficiency of a PSE supply power in a GE scenario according to this application. As shown in FIG. 8, in the GE scenario, when a PD power is 30 W and a CAT5E network cable is used, compared with a traditional Power over Ethernet method, the Power over Ethernet method provided in the embodiments of the present disclosure can improve usage efficiency of a PSE supply power by 10%.

Figure 9:
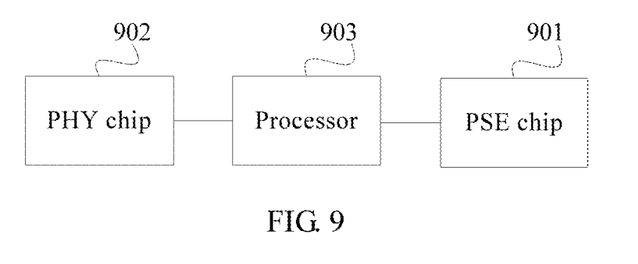
FIG. 9 is a schematic structural diagram of a Power over Ethernet device according to this application.

FIG. 9 is a schematic structural diagram of a Power over Ethernet device according to this application. The Power over Ethernet device may be configured to implement the foregoing Power over Ethernet method. As shown in FIG. 9, the device includes a PSE chip 901, a PHY chip 902, and a processor 903.

The PSE chip 901 is configured to determine a maximum power of a PD according to a classification class of the PD.

The PHY chip 902 is configured to read n measured lengths of a network cable, where n is a positive integer greater than or equal to 1.

The processor 903 is configured to calculate, using a convergence algorithm, a length of the network cable from the n measured lengths of the network cable read by the PHY chip 902, determine a type of the network cable, calculate a loss power of the network cable according to the length of the network cable and the type of the network cable, and use a sum of the maximum power of the PD and the loss power of the network cable as a supply power, to supply power to the PD.

The processor 903 is further configured to calculate an optimal value of each measured length of the network cable using a Kalman filtering algorithm, obtain a convergence length of the network cable from the optimal values of n measured lengths of the network cable using a convergence algorithm, and use the convergence length of the network cable as the length of the network cable, and use an optimal value of a $(k-1)^{th}$ measured length of the network cable as a predictor of a $k^{th}$ length of the network cable, and calculate an optimal value of the $k^{th}$ length of the network cable according to the predictor of the $k^{th}$ length of the network cable and the $k^{th}$ measured length of the network cable.

The processor 903 is further configured to calculate the optimal value $L(k|k)$ of the $k^{th}$ length of the network cable using a formula $L(k|k)=L(k|k-1)+Kg(k)(Z(k)-HL(k|k-1))$, where $L(k|k-1)$ is the predictor of the $k^{th}$ length of the network cable, $Kg(k)$ is a $k^{th}$ Kalman gain of the network cable, $Z(k)$ is a read $k^{th}$ measured length of the network cable, H is a length fluctuation, and a value of H is set to 1.

The processor 903 is further configured to before determining the type of the network cable, determine whether the PHY chip 902 reads a link signal-to-noise ratio of the network cable, and when the PHY chip 902 reads the link signal-to-noise ratio of the network cable, determine the type of the network cable according to a mapping relationship table between the length of the network cable and the type of the network cable and between the link signal-to-noise ratio and the type of the network cable, or when the PHY chip 902 does not read the link signal-to-noise ratio of the network cable, set the type of the network cable to a preset network cable type.

The processor 903 is further configured to determine direct current impedance per 100 meters of the network cable according to the type of the network cable, and calculate the loss power Pch of the network cable using a formula $Pch=Ipd^2*L0*Rs/100$, where Ipd is a maximum current of the PD, Rs is the direct current impedance per 100 meters of the network cable, and L0 is the length of the network cable.

The Power over Ethernet device in the embodiment of the present disclosure is configured to execute the technical solutions of the foregoing method embodiments, implementation principles and technical effects thereof are similar, and details are not described herein.

Figure 10:
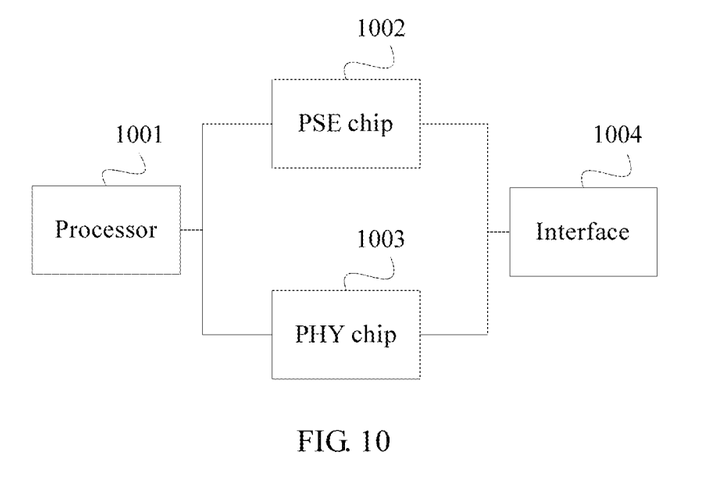
FIG. 10 is a schematic structural diagram of another Power over Ethernet device according to this application.

On the basis of the Power over Ethernet device shown in FIG. 9, FIG. 10 is a schematic structural diagram of another Power over Ethernet device according to this application. As shown in FIG. 10, the device includes a processor 1001, a PSE chip 1002, a PHY chip 1003, and an interface 1004.

The PSE chip 1002 is configured to identify a classification class of a PD and determine a maximum power of the PD according to the classification class of the PD. The PHY chip 1003 is configured to read n measured lengths of a network cable, where n is a positive integer greater than or equal to 1.

PSE may communicate with another device using the interface 1004. Further, the PD may be connected to the interface 1004 using an Ethernet cable such that the PSE can supply power to the PD using the interface 1004 and the Ethernet cable.

The processor 1001 may be a general purpose processor, including a central processing unit (CPU), a network processor (NP), or the like, or may be a digital signal processor (DSP), an application-specific integrated circuit (ASIC), a field-programmable gate array (FPGA), or another programmable logical device.

When the processor 1001 is a CPU, the Power over Ethernet device may further include a memory configured to store a program. Further, the program may include program code, and the program code includes a computer operation instruction. The memory may include a random access memory (RAM), or may include a non-volatile memory (non-volatile memory), for example, at least one disk memory. When the Power over Ethernet device operates, the processor 1001 communicates with the memory, and the processor 1001 executes the program code stored in the memory to implement the foregoing functions.

Optionally, the processor 1001 includes a determining module and a calculation module.

The determining module is configured to determine a type of the network cable.

The calculation module is configured to obtain a length of the network cable between the Power over Ethernet device and the PD, calculate a loss power of the network cable according to the length of the network cable and the type of the network cable, and use a sum of the maximum power of the PD and the loss power of the network cable as a supply power of the PSE.

The Power over Ethernet device in this embodiment of the present disclosure is configured to execute the technical solution of the method embodiment shown in FIG. 1, implementation principles and technical effects thereof are similar, and details are not described herein.

Further, in the embodiment shown in FIG. 10, the calculation module is further configured to calculate, using a Kalman filtering algorithm, an optimal value of each measured length of the network cable from the n measured lengths of the network cable read by the PHY chip 1003, obtain a convergence length of the network cable from the optimal values of the n measured lengths of the network cable using a convergence algorithm, and use the convergence length of the network cable as the length of the network cable.

Further, in the embodiment shown in FIG. 10, the calculation module is further configured to use an optimal value of a $(k-1)^{th}$ measured length of the network cable as a predictor of a $k^{th}$ length of the network cable, and calculate an optimal value $L(k|k)$ of the $k^{th}$ length of the network cable using a formula $L(k|k)=L(k|k-1)+Kg(k)(Z(k)-HL(k|k-1))$, where $L(k|k-1)$ is the predictor of the $k^{th}$ length of the network cable, $Kg(k)$ is a $k^{th}$ Kalman gain of the network cable, $Z(k)$ is a read $k^{th}$ measured length of the network cable, H is a length fluctuation, and a value of H is set to 1.

Further, in the embodiment shown in FIG. 10, the processor 1001 may further include a judging module.

The judging module is configured to before the determining module determines the type of the network cable, determine whether the PHY chip reads a link signal-to-noise ratio of the network cable.

The determining module is configured to when the PHY chip 1003 reads the link signal-to-noise ratio of the network cable, determine the type of the network cable according to a mapping relationship table between the length of the network cable and the type of the network cable and between the link signal-to-noise ratio and the type of the network cable, or when the PHY chip 1003 does not read the link signal-to-noise ratio of the network cable, set the type of the network cable to a preset network cable type.

A Power over Ethernet system provided in this application includes the PSE and the PD in any embodiment of the foregoing embodiments.

For PSE and a PD in this embodiment, refer to related content disclosed in related embodiments related to the PSE and PD in the foregoing embodiments, implementation principles and technical effects thereof are similar, and details are not described herein.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A Power over Ethernet method, comprising:
   determining, by a power sourcing equipment (PSE), a maximum power of a powered device (PD) according to a classification class of the PD;
   reading, by the PSE, n measured lengths of a network cable between the PSE and the PD utilizing a physical layer (PHY) chip, n being a positive integer greater than or equal to 1;
   utilizing, by the PSE, an optimal value of a $(k-1)^{th}$ measured length of the network cable as a predictor of a $k^{th}$ length of the network cable, k=1, 2, . . . n;
   calculating, by the PSE, an optimal value of a $k^{th}$ measured length of the network cable utilizing a Kalman filtering algorithm;
   obtaining, by the PSE, a convergence length of the network cable from the optimal values of the n measured lengths of the network cable;
   utilizing, by the PSE, the convergence length of the network cable as the length of the network cable;
   determining, by the PSE, whether the PHY chip reads a link signal-to-noise ratio (SNR) of the network cable;
   determining, by the PSE, a type of the network cable according to a mapping relationship among the length of the network cable, the type of the network cable, and the link SNR when the PHY chip reads the link SNR of the network cable;
   determining, by the PSE, the type of the network cable as a preset network cable type when the PHY chip does not read the link SNR of the network cable;
   calculating, by the PSE, a loss power of the network cable according to the length of the network cable and the type of the network cable; and
   utilizing, by the PSE, a sum of the maximum power of the PD and the loss power of the network cable as a supply power, to supply power to the PD.

2. The method according to claim 1, wherein calculating, by the PSE, the optimal value of the $k^{th}$ measured length of the network cable utilizing the Kalman filtering algorithm comprises calculating, by the PSE, an optimal value L(k|k) of the $k^{th}$ measured length of the network cable utilizing a formula L(k|k)=L(k|k−1)+Kg(k)(Z(k)−HL(k|k−1)) from K being 1 to n, L(k−1) being the predictor of the $k^{th}$ length of the network cable, Kg(k) being a $k^{th}$ Kalman gain of the network cable, Z(k) being the $k^{th}$ measured length of the network cable, H being a length fluctuation, a value of H being set to 1, the $k^{th}$ Kalman gain Kg(k) being calculated utilizing a formula Kg(k)=P(k|k−1) $H^T$/(HP(k|k−1)$H^T$+R), a covariance corresponding to the predictor of the $k^{th}$ length L(k|k−1) being calculated utilizing a formula P(k|k−1)=AP(k−1|k−1)$A^T$+Q), a covariance corresponding to the optimal value of the $k^{th}$ measured length L(k|k) being calculated utilizing a formula P(k|k)=(I−Kg(k)H)P(k−1|k−1), R indicating noise covariance in the measurement equation,Q indicating covariance of a process noise, I indicating current of the PD $A^T$ being a transpose of a matrix A, A=$A^{T=}$1, $H^T$ being a transpose of a matrix H , and H=$H^T$=1.

3. A Power over Ethernet device, comprising:
   a power sourcing equipment (PSE) chip; and
   a processor coupled to the PSE chip, wherein the PSE chip being configured to determine a maximum power of a powered device (PD) according to a classification class of the PD; and
   a physical layer (PHY) chip coupled to the processor and the PSE chip and being configured to read n measured lengths of a network cable between the PSE and the PD, n being a positive integer greater than or equal to 1,
   the processor being configured to:
      utilize an optimal value of a $(k-1)^{th}$ measured length of the network cable as a predictor of a $k^{th}$ length of the network cable, k=1, 2, . . . n;
      calculate an optimal value of a $k^{th}$ measured length of the network cable utilizing a Kalman filtering algorithm;
      obtain a convergence length of the network cable from the optimal values of the n measured lengths of the network cable;
      utilize the convergence length of the network cable as the length of the network cable;
      determine whether the PHY chip reads a link signal-to-noise ratio (SNR) of the network cable;
      determine a type of the network cable according to a mapping relationship among the length of the network cable, the type of the network cable, and the link SNR when the PHY chip reads the link SNR of the network cable;
      determine the type of the network cable as a preset network cable type when the PHY chip does not read the link SNR of the network cable;
      calculate a loss power of the network cable according to the length of the network cable and the type of the network cable; and
      utilize a sum of the maximum power of the PD and the loss power of the network cable as a supply power, to supply power to the PD.

4. The device according to claim 3, wherein the processor is further configured to calculate an optimal value L(k|k) of the $k^{th}$ measured length of the network cable utilizing a formula L(k|k)=L(k|k−1)+Kg(k)(Z(k)−HL(k|k−1) from K being 1 to n, L(k|k−1) being the predictor of the $k^{th}$ length of the network cable. Kg(k) being a $k^{th}$ Kalman gain of the network cable, Z(k) being the $k^{th}$ measured length of the network cable, H being a length fluctuation, a value of H being set to 1, the $k^{th}$ Kalman gain Kg(k) being calculated utilizing a formula Kg(k)=P(k|k−1) $H^T$/(HP(k|k1)$H^T$+R), a covariance corresponding to the predictor of the $k^{th}$ length L(k|k1) being calculated utilizing a formula P(k|k−1)=AP(k−1|k−1)$A^T$+Q) , a covariance corresponding to the optimal value of the $k^{th}$ measured length L(k|k) being calculated utilizing a formula P(k|k)=(I−Kg(k)H)P(k−1|k−1), R indicating noise covariance in the measurement equation, Q indicating covariance of a process noise, I indicating current of the PD $A^T$ being a transpose of a matrix A, $A=A^T=1$, $H^T$ being a transpose of a matrix H, and $H=H^T=1$.

5. A Power over Ethernet system, comprising:
a power sourcing equipment (PSE);
a powered device (PD), the PSE comprising an Ethernet port coupled to the PD a PSE chip coupled to the Ethernet port, and a processor coupled to the PSE chip, the PSE chip being configured to determine a maximum power of the PD according to a classification class of the PD; and
a physical layer PHY) chip coupled to the PSE and the PD and configured to read n measured lengths of a network cable between the PSE and the PD, n being a positive integer greater than or equal to 1, and
the processor being configured to:
  utilize an optimal value of a $(k-1)^{th}$ measured length of the network cable as a predictor of a $k^{th}$ length of the network cable, k=1, 2, . . . n;
  calculate an optimal value of a $k^{th}$ measured length of the network cable utilizing a Kalman filtering algorithm;
  obtain a convergence length of the network cable from the optimal values of the n measured lengths of the network cable;
  utilize the convergence length of the network cable as the length of the network cable;
  determine whether the PHY chip reads a link signal-to-noise ratio (SNR) of the network cable;
  determine a type of the network cable according to a mapping relationship among the length of the network cable, the type of the network cable, and the link SNR when the PHY chip reads the link SNR of the network cable;
  determine the type of the network cable as a preset network cable type when the PHY chip does not read the link SNR of the network cable;
  calculate a loss power of the network cable according to the length of the network cable and the type of the network cable; and
  utilize a sum of the maximum power of the PD and the loss power of the network cable as a supply power, and the PSE chip being configured to supply power to the PD according to the supply power.

6. The system according to claim 5, wherein the processor is further configured to calculate an optimal value L(k|k) of the $k^{th}$ measured length of the network cable utilizing a formula L(k|k)=L(k|k-1)+Kg(k)(Z(k)-HL(k|k-1)) from K being 1 to n, L(k|k-1) being the predictor of the $k^{th}$ length of the network cable, Kg(k) being a $k^{th}$ Kalman gain of the network cable, Z(k) being the $k^{th}$ measured length of the network cable, H being a length fluctuation, a value of H being set to 1, the $k^{th}$ Kalman gain Kg(k) being calculated utilizing a formula Kg(k)=P(k|k-1)$H^T$/(HP(k|k-1)$H^T$+R), a covariance corresponding to the predictor of the $k^{th}$ length L(k|k-1) being calculated utilizing a formula P(k|k-1)=AP(k-1|k-1)$A^T$+Q), a covariance corresponding to the optimal value of the $k^{th}$ measured length L(k|k) being calculated utilizing a formula P(k|k)=(I-Kg(k)H)P(k-1|k-1), R indicating noise covariance in a measurement equation, Q indicating covariance of a process noise, I indicating current of the PD $A^T$ being a transpose of a matrix A, $A=A^T=1$, $H^T$ being a transpose of a matrix H, and $H=H^T=1$.

* * * * *

UNITED STATES PATENT AND TRADEMARK OFFICE
CERTIFICATE OF CORRECTION

PATENT NO. : 10,075,302 B2
APPLICATION NO. : 15/353278
DATED : September 11, 2018
INVENTOR(S) : Jincan Cao Page 1 of 1

It is certified that error appears in the above-identified patent and that said Letters Patent is hereby corrected as shown below:

On the Title Page

Item (30), Line 1: "201510859723" should read "201510859723.1"

In the Specification

Column 15, Line 64: "1to n, L(k-1)" should read "1 to n, L(k|k-1)"

Column 16, Line 14: delete "wherein"

Column 16, Line 60: "(HP(k|k1)" should read "(HP(k|k-1)"

Column 16, Line 62: "L(k|k1)" should read "L(k|k-1)"

Signed and Sealed this
Sixth Day of November, 2018

Andrei Iancu
*Director of the United States Patent and Trademark Office*